Oct. 30, 1962   R. L. HOHLER ET AL   3,061,749
COMMUTATOR
Filed July 9, 1959
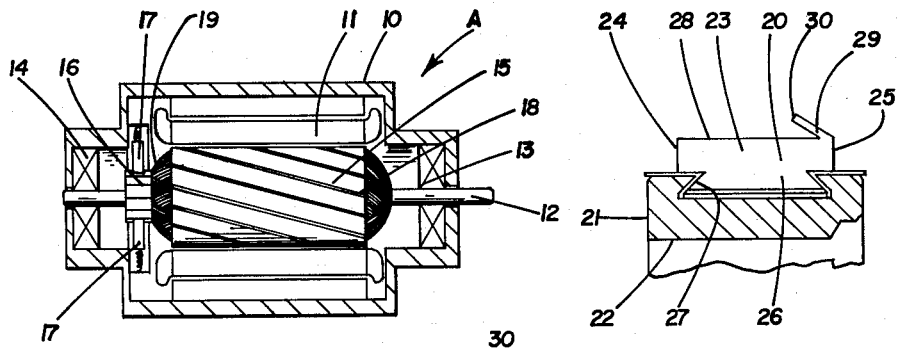
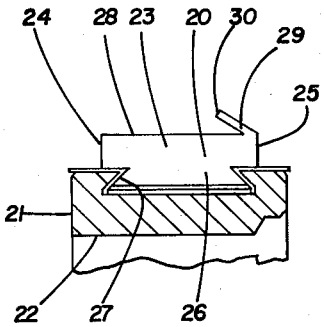
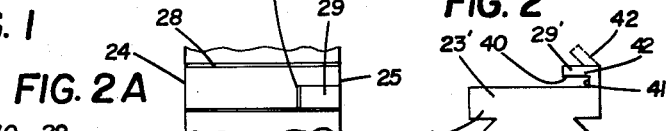
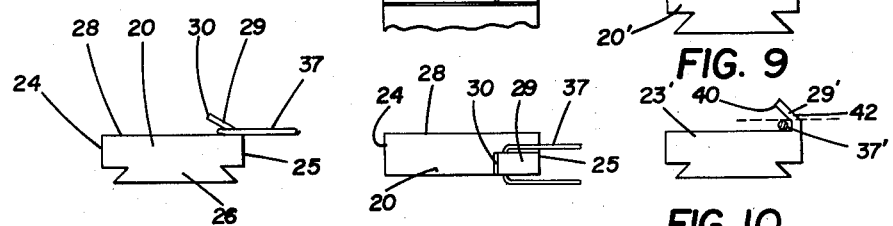
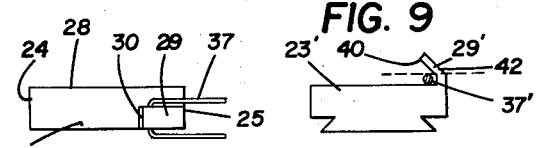
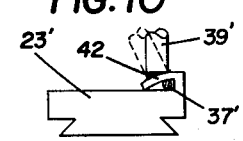
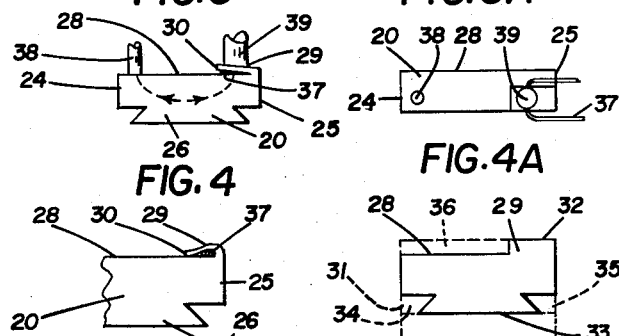
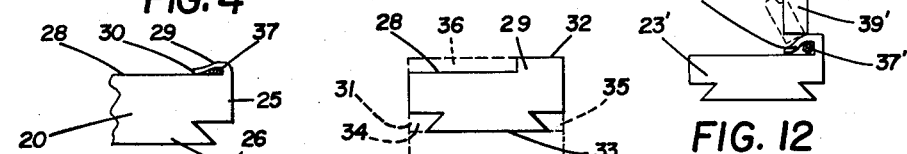
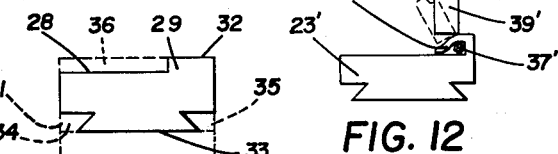
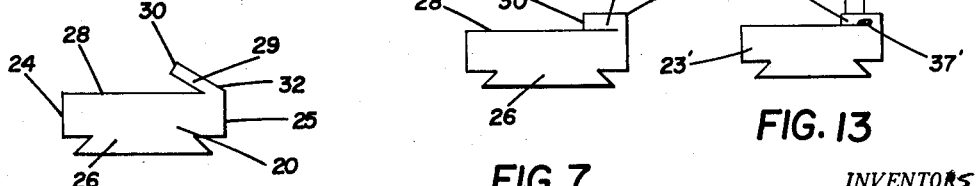
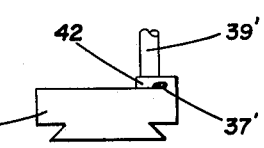
INVENTORS
ROBERT L. HOHLER
LLOYD D. YARNELL
BY GLEIM & CANDOR
ATTORNEY

United States Patent Office 3,061,749
Patented Oct. 30, 1962

3,061,749
COMMUTATOR
Robert L. Hohler and Lloyd D. Yarnell, Dayton, Ohio, assignors, by mesne assignments, to Hoover Ball and Bearing Company, Saline, Mich., a corporation of Michigan
Filed July 9, 1959, Ser. No. 826,015
3 Claims. (Cl. 310—234)

This invention relates to commutators for dynamoelectric apparatus, and, in particular, this invention relates to an improved dynamo-electrical apparatus, an improved method for securing electrical leads from the coils of an armature of a dynamo-electric apparatus to the commutator of such apparatus, an improved commutator for such an apparatus or the like, an improved commutator segment for such a commutator or the like, and a method of making such an improved commutator segment or the like.

Heretofore, many problems have existed in the dynamoelectric apparatus field concerning the methods and structures utilized to electrically connect the various coils of the armature of such apparatus to the desired commutator segments of the commutator of such apparatus. In particular, the wire utilized to form the coils of the armature is insulated, such as by being covered or coated with a suitable insulating material or the like, and, therefore, it is necessary to effect a removal of such insulation on a particular wire section of each armature coil in order to effectively electrically connect that particular section of the wire to a desired commutator segment.

In the past, such insulation removal step or operation is performed first, and then the bared wire section is subsequently, electrically secured to a particular commutator segment by welding, soldering, mechanical locking means, and the like. However, it has been found that such an independent insulation removal operation is relatively costly because of the time element and manual labor involved.

It has also been found in the past, that an insulated wire section can be directly welded to a commutator segment by simultaneously heating the wire section and commutator segment whereby the heat involved simultaneously burns away the insulation on the wire section and welds the wire section to the commutator segment. It has been found, however, according to the teachings of this invention, that this prior known method can be greatly improved as will be evidenced hereinafter.

Accordingly, one of the objects of the present invention is to provide an improved method for securing a length of a wire of an armature coil of a dynamo-electric apparatus to a commutator segment of such apparatus.

It is another object of the present invention to provide an improved dynamo-electric apparatus.

A further object of the present invention is to provide an improved commutator for such a dynamo-electric apparatus or the like.

Another object of the present invention is to provide an improved and better commutator segment for such a commutator or the like.

It is another object of the present invention to provide an improved method for making such a commutator segment or the like.

Other uses, objects, and advantages of this invention will become apparent upon a reading of the following specification taken in conjunction with the accompanying drawing forming a part thereof and wherein:

FIGURE 1 is a partially broken-away, axial cross-sectional view of a dynamo-electric apparatus formed in accordance with the teachings of this invention;

FIGURE 2 is a fragmentary, enlarged axial cross-sectional view of the improved commutator of this invention and illustrates, in elevation, an improved commutator segment of this invention;

FIGURE 2A is a top view of the commutator segment illustrated in FIGURE 2;

FIGURES 3 and 4, and FIGURES 3A and 4A are respectively views similar to FIGURES 2 and 2A and illustrate an improved method for securing an electrical lead to the commutator segment;

FIGURE 5 is an axial, cross-sectional view of a commutator segment having an electrical lead secured thereto in a manner according to the teachings of this invention; and FIGURES 6, 7, and 8 illustrate in elevation, a method of making a commutator segment in accordance with the teachings of this invention.

FIGURE 9 is an enlarged, fragmentary side view of another embodiment of the commutator segment of this invention.

FIGURES 10, 11, 12 and 13 are views similar to FIGURE 9 illustrating a method of this invention for securing a wire to the commutator segment of FIGURE 9.

Reference is now made to the accompanying drawing wherein like reference numerals and letters are used throughout the various figures thereof to designate like parts where appropriate, and particular reference is made to FIGURE 1 illustrating an improved dynamo-electric apparatus formed in accordance with the teachings of this invention and generally indicated by the reference letter A.

The apparatus A comprises a housing 10, a conventional stator arrangement 11, and a shaft 12 rotatively supported in the housing 10 by suitable end bearing means 13 and 14. The shaft 12 carries an armature 15 which is concentrically disposed within the stator 11 and also carries a commutator 16 at one end thereof which is spaced from the armature 15 and is adapted to cooperate with suitable brushes 17 in a manner well known in the art.

The armature 15 is provided with a plurality of slots 18 which respectively receive coils of insulated wire, being indicated generally by the reference numeral 19, in a manner well known in the art.

The improved commutator 16 comprises a plurality of commutator segments 20 arranged circumferentially about a commutator core 21, the commutator core 21 being formed from steel if desired and being insulated from the commutator segments 20 by suitable nonconductive or insulating material or materials and having a central bore 22 passing therethrough whereby the commutator 16 is telescopically received on the end of the shaft 12.

Each commutator segment 20 comprises an elongated, flat narrow body portion 23 having a pair of opposed ends 24 and 25. A dovetail projection or tongue 26 extends from the bottom of the body portion 23 of each commutator segment 20 and is adapted to cooperate with a dovetail slot 27 formed in the commutator core 21 in a manner well known in the art whereby the commutator segments 20 are secured to the core 21. The elongated body portion 23 of each commutator segment 20 has an arcuate top surface 28 which is designed to define a segment of a cylinder whereby the top surfaces 28 of the segments 20 cooperate together to define a cylindrical outer surface of the commutator 16.

An integrally connected elongated tang or riser 29 projects outwardly from the body portion 23 of each commutator segment 20 adjacent the end 25 thereof. Each tang 29 is so constructed and arranged that the same is angularly disposed with respect to the top surface 28 of the respective commutator segment 20, and has a free end 30 thereof extending toward the other end 24 of the commutator segment 20.

One method of this invention which is utilized to make commutator segments 20 is illustrated in FIGURES 6-8. In particular, a hollow cylindrical commutator blank 31 is provided as illustrated in phantom in FIGURE 6. The commutator blank 31 has an outer cylindrical peripheral surface 32 and an internal cylindrical peripheral surface 33, the internal peripheral surface 33 being defined by a bore passing centrally through the blank 31. The commutator blank 31 is then cut away at 34 and 35 by suitable means to produce the dovetail tongues 26 previously described.

The outer portion of the commutator blank 31 is cut away or reduced at 36 by suitable means whereby an elongated integrally connected riser or tang 29 is formed, the reducing operation forming the top surfaces 28 of the commutator segments 20. A portion of the riser or tang 29 is separated from the body portion 23 of the commutator blank 31 by sawing, shearing, or the like which, in effect, extends the top surface 28 a predetermined distance under the riser 29 in the manner illustrated in FIGURE 7. The separated or free end 30 of the thus formed riser 29 is then bent away from the top surface 28 of the blank 31 whereby the tang or riser 29 projects from the body portion 23 of the blank 31 and is disposed at an angle relative to the top surface 28 for a purpose later to be described. Subsequently, the individual commutator segments 20 are cut from the thus formed cylindrical blank 31 in a well known manner.

It is to be understood, of course, that the commutator segments 20 can be formed from individual commutator segment blanks, the commutator segment blank corresponding to a section of the commutator blank 31. Further, it is to be understood that the riser or tang 29 could extend across the entire width of each commutator segment 20, across a desired part thereof, or be located in any desired position thereon.

Further, the commutator 16 may be formed by assembling a plurality of commutator segment blanks to the core 21, the segment blanks corresponding to blanks similar to those illustrated in dotted or full lines in FIGURE 6. After such commutator segment blanks have been assembled to the core 21, the risers 29 are formed thereon by turning down the body portions 23 thereof if the blanks correspond to those illustrated in dotted lines in FIGURE 6. The risers 29 are then partially separated from the respective body portions 23. The risers are then bent at an angle relative to the respective surfaces 28 either simultaneously with the separation operation or subsequently thereto.

After the commutator 16 has been assembled from a plurality of commutator segments 20 and has been secured on the shaft 12, at least one coil of the armature 15 is electrically connected to each commutator segment 20 in the following manner.

As each coil for the armature 15 is formed, an extended loop of wire is provided which is adapted to be looped around a tang 29 of a desired commutator segment 20 in the manner illustrated in FIGURE 3, the looped wire section being generally indicated by the reference numeral 37. In this manner, a length of the looped wire section 37 is disposed between the tang 29 and the adjacent body portion 23 of the commutator segment 20.

As previously stated, the coils for the armature 15 are formed from insulated covered or coated wire. Therefore, in order to provide good electrical contact between the looped wire sections 37 and the commutator segments 20, such insulation must be effectively removed. As shown schematically in FIGURE 4, a pair of electrodes 38 and 39 are brought, either simultaneously or sequentially as desired, into contact with each commutator segment 20, the electrode 38 making electrical contact with the body portion 23 thereof and the electrode 39 making electrical contact with the tang 29 thereof. When the electrode 39 is brought into contact with the tang 29 the same bends the tang 29 toward the top surface 28 of the segment 20 whereby the length of insulated wire disposed beneath the tang 29 is compressed and deformed between the tang 29 and the body portion 23 of the segment 20. By thus compressing and deforming the length of wire between the tang 29 and the body portion 23, the insulation thereof is cracked or brokn open. In this manner, good electrical contact is effected between portions of the deformed length of the wire section 37 and the tang 29 and top surface 28 of the commutator segment 20. As shown in FIGURE 4, electrical current passes between the electrodes 38 and 39 in such a manner that the heat generated not only burns away the remaining insulation on the compressed length of the wire section 37 but also effectively welds the length of wire to the tang 29 and the body portion 23 of the commutator segment 20. It is to be understood, however, that the welding and insulation removal heat can be provided by other means than resistance welding.

As shown in FIGURE 5, the length of the wire section 37 is not only welded to the commutator segment 20 but is also secured thereto by the mechanical locking effect of the tang 29 whereby malfunctioning of the dynamo-electric apparatus A is prevented even though a defective weld occurs between a wire section 37 and its respective commutator segment 20. Accordingly, the mechanical locking effect of the tang 29 provides an improved safety feature not present in prior known structures.

By thus securing the looped wire sections 37 to the body portions 23 of the commutator segments 20 in the above manner, it can be seen that the apparatus utilizing such a commutator 16 can be designed to accommodate a commutator having a relatively small effective diameter and/or length as the risers 29 are disposed flat relative to the segments 20 rather than in a raised or extended position as provided in various prior known commutators.

It has been found according to the teachings of this invention, that if the copper or other metal of the commutator segments 20 is harder than the copper or other metal of the wire sections 37 to be respectively secured thereto, there is a tendency of the tangs 29 to shear or cut the wire sections 37 when the wire sections are compressed between the respective tangs 29 and body portions 23 of the commutator segments 20. Accordingly, the commutator segments 20 may be modified in the manner hereinafter set forth to eliminate such shearing or cutting disadvantages.

As shown in FIGURE 9, a commutator segment 20' is initially formed with a riser or tang 29' in the manner previously described. However, when part of the tang 29' is separated from the body portion 23' of the commutator segment 20' by suitable cutting means the under surface 40 of the tang 29' is spaced a predetermined distance above the thus extended top surface 28' of the commutator segment 20', the predetermined distance being defined by the length of a vertical portion 41 of the riser 29'. The length of the portion 41 is slightly greater than the cross-sectional thickness of the wire to be secured to the respective commutator blank 20' for a purpose hereinafter described.

After the riser 29' has been partially separated from the body portion 23', the severed portion 42 is bent at an angle relative to the top surface 28' of the segment 20 as shown in dotted lines in FIGURE 9 and in full lines in FIGURE 10.

After a length of a wire section 37' has been looped behind the tang 29' in the manner illustrated in FIGURE 10, the separated portion 42 of the tang 29 is bent toward the surface 28' by an electrode 39'. However, the upstanding portion 41 of the riser 29' initially prevents contact between the riser 29' and the wire section 37' as illustrated in FIGURE 11. Further compression of the tang 29' toward the body portion 23' of the segment 20' causes the tang 29' to engage the length of the wire section 37' and compress and deform the same in the manner previously described whereby the insulation on the length of the wire section 37' is broken or separated. However, at this time the heat from the electrode 39' has sufficiently softened the riser 29' so that the same does not shear or cut the wire section 37'. The electrode 39' completes the welding and insulation removal operation in the manner illustrated in FIGURE 13 whereby the length of the wire section 37' is welded to the body portion 23' and tang 29' and is mechanically locked therebetween.

Accordingly, it can be seen that there has been provided improved methods and structures for effectively securing electrical leads to commutator segments.

While the foregoing presents preferred embodiments of the present invention, it is obvious that other modifications and/or equivalents may be employed without departing from the scope of the invention, which is defined in the appended claims.

What is claimed is:

1. The method of making a commutator and securing armature lead wires thereto comprising mounting a plurality of commutator segments in an insulated relation on a core, shaping said segments so that each has a body portion provided with a pair of ends and an outer surface extending between said ends with an integral riser on said outer surface adjacent one of said ends, separating a portion of each of said risers remote from said one end from its associated body portion, bending the separated portion of each of said risers in a direction away from the outer surface of its associated body portion to a position in which the included angle between each riser and said outer surface is less than 90°, positioning a lead wire between each bent riser and the outer surface of its associated body portion, and bending each riser in a reverse direction toward the outer surface of its associated body portion so as to clamp a lead wire between said riser and said body portion.

2. In a method of making a commutator segment having an integral tang for securing an electrical lead to said segment, the steps comprising shaping said segment so that it has a body portion provided with a pair of ends and an outer surface of predetermined width extending between said ends with an integral riser on said outer surface adjacent one of said ends and of a length less than the distance between said ends and of a width less than the width of said outer surface, separating a portion of said riser remote from said one end from said body portion, and bending said separated portion of said riser away from said outer surface to a position in which the included angle between said separated portion and said outer surface is less than 90°.

3. A commutator comprising a core, a plurality of insulated commutator segments mounted on said core, each of said segments having a body portion provided with a pair of ends and an outer surface extending between said ends, each of said outer surfaces having an integral tang formed thereon at one end of said body portion, said tangs being inclined relative to said body portions so that the included angle between each tang and the outer surface from which it extends is less than 90° and each tang being of a length less than the distance between the ends of the body portion and on which it is formed, whereby each tang is readily bent toward the outer surface on which it is formed for clamping a lead wire between said tang and outer surface.

References Cited in the file of this patent

UNITED STATES PATENTS

| | | |
|---|---|---|
| 702,272 | Windle | June 10, 1902 |
| 1,189,235 | Brown | July 4, 1916 |
| 1,276,856 | Apple | Aug. 27, 1918 |
| 2,250,156 | Ferguson | July 22, 1941 |
| 2,535,825 | Wahlberg | Dec. 26, 1950 |
| 2,572,956 | Servis | Oct. 30, 1951 |
| 2,648,792 | Wylie | Aug. 11, 1953 |
| 2,826,707 | Camprubi | Mar. 11, 1958 |